United States Patent Office 3,121,275
Patented Feb. 18, 1964

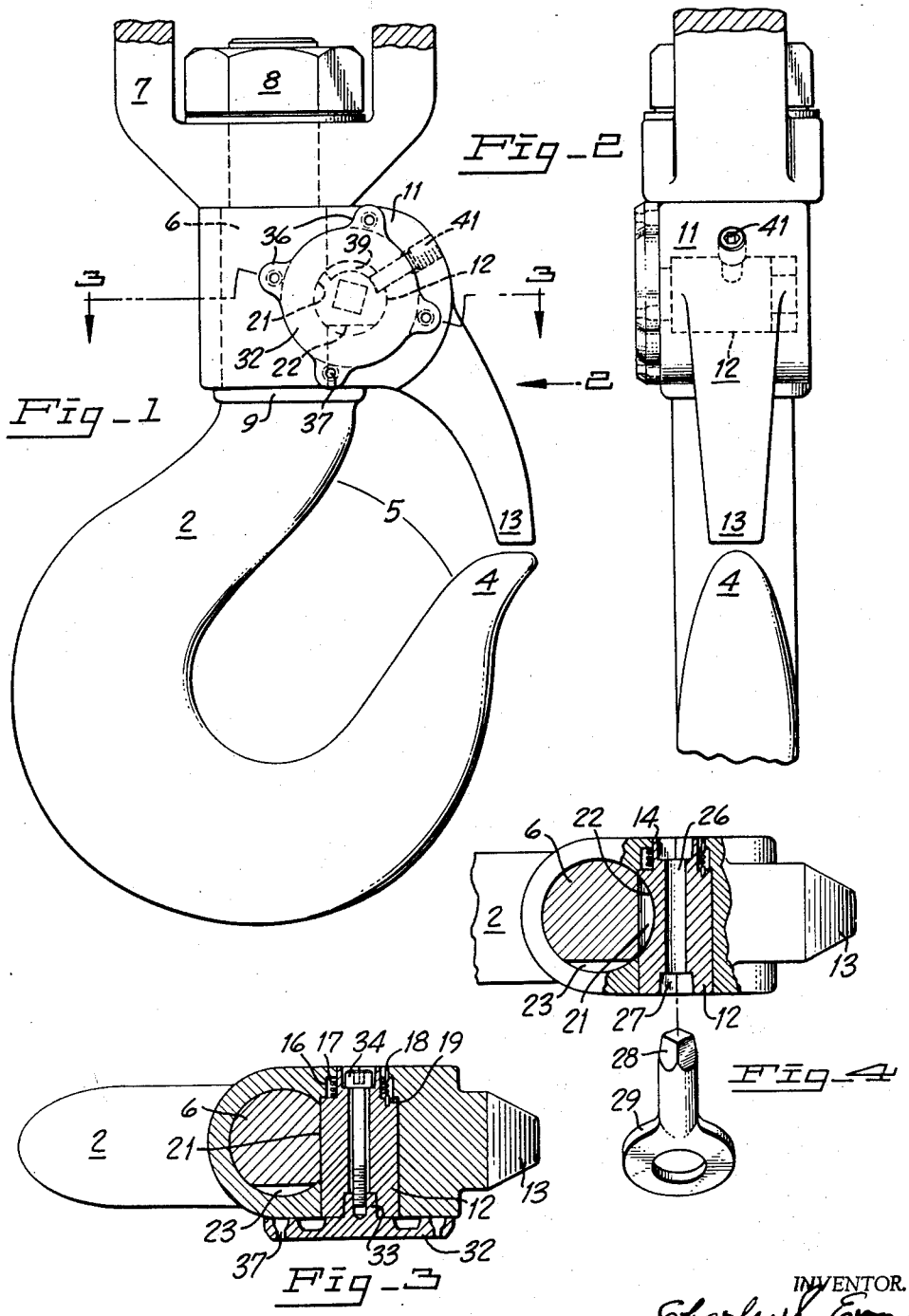

3,121,275
SAFETY HOOK
Charles S. Evans, 124 Isabella Ave., Atherton, Calif.
Filed Sept. 1, 1961, Ser. No. 135,622
13 Claims. (Cl. 24—241)

My invention relates to hoisting hooks and the broad purpose of my invention is the provision of an improved safety gate for preventing accidental release of the load in the hook, and unintended catching of the hook in extraneous objects or structures.

Other objects of the invention include the provision of:

A safety gate which closes from open position and locks automatically.

A safety gate movable to closed or open position manually or by a jerk line from a remote point.

A safety gate which is secure against accidental opening because of collision with some other object.

A safety gate of rugged simple construction, with costs of manufacture and assembly in the low range.

A safety gate especially suitable for logging operations or uses with similar requirements, because it presents a substantially streamlined surface, with key operated unlocking means which may be concealed and protected within the body of the gate.

A safety gate characterized by a simple, rugged structure, convenient and dependable construction, and adaptable for use in a wide variety of sizes and types of hoisting hooks.

Other objects will be set forth in the following description of the invention which is illustrated in the accompanying drawings. It is understood that I do not limit myself to the embodiment of my invention shown in the said description and drawings, as I may adopt other embodiments within the scope of my invention as set forth in the claims.

In the drawings, I have chosen for illustration a number 6 hook of conventional shape having a 1" x 3" shank and 1⅜" throat opening.

FIG. 1 is a side elevation of an embodiment of my invention. The upper part of the conventional bail is broken away to reduce the length of the figure.

FIG. 2 is an elevation of the hook shown in FIG. 1. The direction in which the view is taken is indicated by the arrow 2 in FIG. 1.

FIG. 3 is a sectional view of the hook shown in FIG. 1. The section is taken in the horizontal plane indicated by the line 3—3 of FIG. 1.

FIG. 4 is a sectional view of my hook in the same plane as in FIG. 3, but omitting the left end of the hook body and the assembled wheel key, but including a detachable contact key.

The use of safety gates on hoisting hooks has increased greatly in recent years, not only in accompanying the normal expansion of industry, but because of the steady pressure to provide greater safety to workmen. An open hook swinging on a hoisting line can be a serious menace to workmen and property whether it is empty or loaded. Besides an accidental release of its load, an open hook may be snagged in running gear and rigging or even in stationary parts of building or ship in spite of skilled handling by the hoist or crane operator. Any such mishap may cause injury or death to adjacent workmen in addition to serious property loss. An open hook is particularly troublesome or even hazardous in lumbering and dragline operations, where fallen logs and dragged over ground covered with undergrowth. It such cases, a hook having a locked gate and with no projecting parts is necessary for prompt release of its load and its efficient use.

In order to make my safety hook adaptable to uses in which external interference is most likely to occur, I enclose a rotatable locking roll or bolt wholly within the body of the gate, and arrange a narrow operating handwheel close to the body on the outside face thereof as shown in FIGS. 1, 2 and 3. If desired, the handwheel may be detached and used on either side of the hook in the manner of a key to unlock the roll so that the gate may be swung open. Without the handwheel as shown in FIG. 4, the locked gate hook is substantially streamlined; and in use has little or no tendency to collect bothersome debris. In certain types of operation the unlocking of the gate is more conveniently done by a squarred-shank key as shown in FIG. 4. This is customarily carried on a short thong attached to wrist or belt.

In detail, my safety hook comprises a main body 2 which curves around in the bight 3 and ends in the point 4, spaced from the other end of the body to form a throat 5, through which the cable ties or chain supporting the load must pass to lodge in the bight.

Extending upwardly from the body 2 is a cylindrical journal shank 6, on the end of which a conventional bail 7 is secured by a nut 8, threaded on the shank over a bearing washer. The upper end of the body 2 is formed with a flange 9; and that portion of the journal shank lying between the flange and the bail base provides the journal mounting for the gate 11.

Hook forgings in their common or standard proportions are designed to carry up to 50% above safe working load. Failure of the hook above that, being usually in a straightening of the hook to widen the throat rather than in any distortion of the shank. Since the locking means in my hook includes a cylindrical locking roll 12, extending across the 1" shank, and lying at a maximum depth of about ⅛" within its cylindrical surface, the cross sectional area through the shank at the intersection is somewhat reduced and the shank correspondingly weakened in tensile strength. Such reduction of cross section however is not critical since it need not exceed 2½ % at the full lock recess in the front face of the shank and 1 to 1¼ % at the half lock recess at the side of the shank.

The gate swings freely about the shank axis to close the throat 5, with its free end 13 aligned with the hook point 4, or on one side to leave the throat wide open. Means are provided for automatically locking the gate in either position; that is to say automatically locking the gate across the throat as shown in FIG. 1, or automatically locking the gate to one side, leaving the throat open. From either of these positions it must be unlocked before it can be moved. On the opposite side of the shank no locking recess is provided, so that when the gate is swung to that side, it is free and can be swung back to throat-closing position by pole or other manipulation, where it locks automatically.

Journalled in the upper portion of the gate is the locking roll 12, one end 14 of which is reduced in diameter so that a widening of the bore at this point leaves a closed annular recess 16 surrounding the inner portion of the reduced end 14. The main body of the roll has a journal bearing in the gate and each end is flush with the adjacent side face thereof.

Disposed around the roll end 14, within the concentric recess 16 is a coil spring 17. One end 18 of the spring is anchored in the gate body and the other end 19 is anchored in the end of the roll. The spring is proportioned and arranged to exert a substantial rotational force in a counter clockwise direction as viewed in FIG. 1; and this force must be overcome by force rotating the roll in a clockwise direction to unlock the gate from the shank.

Both roll and shank have cylindrical recesses in the sides thereof complementary to each other. The recess 21 in the shank is coincident with the cylindrical surface of the roll, and when the roll occupies it, as shown in FIGS. 1 and 3, the gate is securely locked across the throat of the hook, the free ends 4 and 13 being aligned. The recess 22 in the roll is preferably coincident with the cylindrical surface of the shank; and when the roll is turned clockwise about 90° from its position in FIGS. 1 and 3 to the position shown in FIG. 4, the gate is unlocked and free to be swung in either direction about its bearing on the shank. When so turned, the cylindrical face of the roll recess slides along the cylindrical surface of the shank, but instantly upon return of the gate to position aligned with the hook point 4, the roll, pressed by the spring, snaps through an arc of 90° to again occupy the shank recess and lock the gate across the throat. If desired a shallow recess 23 may be provided on one or both sides of the shank so that the gate may be temporarily held in open position.

True coincidence of the recesses with opposing cylindrical surfaces is not necessary to operation, but is preferred for larger stress-bearing surfaces and longer wear. Of course a working clearance is necessary.

Means are provided for rotating the locking roll through about 90° of arc, against the pressure of the spring 17; and for limiting such rotation to the critical arc within which full engagement of the roll with the shank and complete disengagement thereof occurs.

Extending axially through the locking roll is a bore 26 terminating at each end in a squared or hexagonal socket 27, preferably with walls slightly tapering inwardly so that fast firm engagement with the similarly shaped shank 28 of a key 29, FIG. 4, may readily be made, working from either side of the hook. The key is preferably carried on a short thong or chain attached to the wrist or belt of the operator. In FIG. 3, the key is shown as a wheel 32 having a squared shank 33 secured in the roll by a screw 34 extending through the bore 26, the head of the screw lying in the opposite socket.

The wheel which may be assembled on either side lies close to the side face of the gate, and on its perimeter are formed several extensions 36, each one having therethrough a hole 37, enlarging on the inner face of the wheel to hold the knot of a jerk line, by which the wheel may be turned to unlock the gate, and then the gate pulled to one side. Similar manipulation of the wheel unlocks and swings the gate back to throat closing position and automatic locking.

For drag line operations, my key-actuated hook as shown in FIG. 4 is best adapted. For general use where a workman is available at both loading and unloading stations, the wheel operated hook as shown in FIG. 3 should be used, the wheel providing direct manual control. A jerk line may be attached for remote control, the line not only turning the roll to unlock the gate, but also serving to pull the gate to one side to lock automatically in open position, the roll engaging the side slot 23. From any open position the gate locks automatically when swung into alignment with the hook point 4.

Means are provided for limiting the rotary movement of the roll preferably to about 90°, so that the roll may be turned from a position in which a cylindrical portion of the roll lies in the journal shank recess (FIG. 3) to lock the gate on the shank, to a position in which the roll recess coincides with the cylindrical surface of the shank (FIG. 4) which allows the gate to be swung to either side. Formed in the upper surface of the roll as seen in FIG. 1, is a narrow, shallow circumferential groove 39. A dog point set screw 41, threaded into the heavy portion of the gate above the roll, engages in the groove and serves not only to limit the rotation of the roll, but also to prevent axial displacement thereof.

I claim:

1. A hoisting hook having a cylindrical shank and a hook body with an open throat, a gate journaled about the shank for free rotary movement across the throat to close or open the throat, said shank having a recess with a cylindrical surface extending laterally across the side thereof, a cylindrical locking roll rotatably journaled in the gate with ends substantially flush with adjacent sides of the gate and extending entirely across said shank recess to lock the gate across the throat, said roll having a recess in the side thereof whereby rotary movement of the roll frees it from said shank as said recesses align, and means for selectively rotating the roll to engage it with the shank or disengage it therefrom.

2. A hoisting hook in accordance with claim 1 in which stop means are fixed on the gate body to limit the rotary movement of the roll.

3. A hoisting hook in accordance with claim 1 in which a coiled spring is interposed between the roll and the gate to rotate the roll in one direction, and an external key is operatively connected to the roll to rotate it in the other direction.

4. A hoisting hook in accordance with claim 1 in which the roll in at least one of its ends is formed with a socket in which rotating means is engageable.

5. A hoisting hook in accordance with claim 1 in which spring means urges rotation of the roll to engage the shank, and manually operable means is provided to rotate the roll to disengage the gate from the shank.

6. A hoisting hook in accordance with claim 1 in which a spring is interposed between the gate and the roll to rotate the roll in one direction, and manually operable means is connected to the roll to rotate it in the other direction.

7. A hoisting hook having a cylindrical shank and a hook body with an open throat, a gate journaled about the shank for free rotary movement across the throat to close or open the throat, a cylindrical locking roll rotatably journaled in the gate to intersect the shank and having a socket in one end of the roll, each said roll and shank having in its side a cylindrical recess complementary to the cylindrical shape of the other, spring means interposed between the roll and the gate and urging rotation of the roll to engage in the shank recess, and means engageable in the end socket of the roll for rotating the roll against the spring means to align the cylindrical recess in the roll with the cylindrical surface of the shank whereby said gate can be rotated about said shank to open said throat.

8. A hoisting hook having a cylindrical shank and a hook body with an open throat, a gate journaled about the shank to close or open the throat by rotary movement from both sides thereof, a cylindrical locking roll rotatably journaled in the gate to intersect the shank and having a socket in one end of the roll, each said roll and said shank having in its side a cylindrical recess complementary to the cylindrical shape of the other, and means cooperating with said socket for selectively rotating the roll to engage its cylindrical body within the shank recess to prevent rotation of the gate or to align its cylindrical recess with the cylindrical recess of the shank whereby said gate is free to rotate about said shank to open said throat.

9. A hoisting hook having a cylindrical shank and a hook body with an open throat, a gate journaled about the shank to close or open the throat, said shank having a recess with a cylindrical surface extending laterally across its side, a cylindrical locking roll lying wholly within the gate and journaled therein and having an axial bore extending therethrough, said roll extending laterally into said shank recess to lock the gate across the throat, said roll having a recess in its side whereby rotary movement of the roll frees it from said shank as said recesses align, and means engageable in said axial bore for rotating the roll to engage it with the shank recess or disengage it therefrom.

10. A hoisting hook in accordance with claim 9 in which stop means are arranged between the roll and the gate to limit the rotary movement of the roll and prevent axial shifting thereof.

11. A hoisting hook in accordance with claim 9 in which the gate is journaled for free rotary movement on both sides of the hook body and throat.

12. A hoisting hook in accordance with claim 9 in which the gate is journaled for free rotary movement on both sides of the hook body and throat, and the cylindrical locking roll lies wholly within the gate.

13. A hoisting hook in accordance with claim 9 in which the gate is journaled for free rotary movement on both sides of the hook body and throat, the locking roll lies wholly within the gate, and stop means are arranged between the roll and the gate to limit the movement thereof.

References Cited in the file of this patent

UNITED STATES PATENTS

| | | |
|---|---|---|
| 2,728,967 | Burnham | Jan. 3, 1956 |
| 2,837,364 | Loeh | June 3, 1958 |

FOREIGN PATENTS

| | | |
|---|---|---|
| 321,367 | France | Sept. 9, 1902 |